(12) United States Patent
Scherer et al.

(10) Patent No.: US 11,806,813 B2
(45) Date of Patent: Nov. 7, 2023

(54) ACCUMULATOR ASSEMBLY WITH AN IMPROVED WELDING TECHNIQUE FOR A CELL CONNECTOR ELEMENT

(71) Applicant: Bayerische Motoren Werke Aktiengesellschaft, Munich (DE)

(72) Inventors: Daniel Scherer, Munich (DE); Bernhard Nitschke, Munich (DE); Ruediger Daub, Groebenzell (DE); Christoph Born, Munich (DE); Philip Kotter, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 906 days.

(21) Appl. No.: 15/858,291

(22) Filed: Dec. 29, 2017

(65) Prior Publication Data

US 2018/0117714 A1 May 3, 2018

Related U.S. Application Data

(63) Continuation of application No. PCT/EP2016/062463, filed on Jun. 2, 2016.

(30) Foreign Application Priority Data

Jul. 14, 2015 (DE) ...................... 10 2015 213 129.7

(51) Int. Cl.
*B23K 20/12* (2006.01)
*B23K 31/02* (2006.01)
(Continued)

(52) U.S. Cl.
CPC ........ *B23K 31/025* (2013.01); *B23K 20/1265* (2013.01); *B60L 50/64* (2019.02);
(Continued)

(58) Field of Classification Search
CPC .................. B23K 31/025; B23K 20/1265; H01M 50/502
See application file for complete search history.

(56) References Cited

U.S. PATENT DOCUMENTS

| 3,960,603 A | 6/1976 | Morioka et al. |
| 2005/0079408 A1 | 4/2005 | Hirano |

(Continued)

FOREIGN PATENT DOCUMENTS

| CN | 1592977 A | 3/2005 |
| CN | 101809779 A | 8/2010 |

(Continued)

OTHER PUBLICATIONS

Chinese-language Office Action issued in counterpart Chinese Application No. 201680021234.1 dated Oct. 9, 2019 with English translation (18 pages).

(Continued)

*Primary Examiner* — Ula C Ruddock
*Assistant Examiner* — Frank A Chernow
(74) *Attorney, Agent, or Firm* — Crowell & Moring LLP

(57) ABSTRACT

An accumulator assembly includes first and second accumulator cells, each of which includes at least one electrical connection element. The accumulator assembly also includes a cell connector element which electrically connects the electrical connection element of the first accumulator cell with the electrical connection element of the second accumulator cell. The cell connector element is welded at least onto one of the electrical connection elements via a plurality of welding locations. The number and the location of the welding locations are selected according to an expected current density in such a way that more welding locations are arranged at locations with a higher (Continued)

expected current density, and zero or fewer welding locations are arranged at locations with a lower expected current density.

11 Claims, 6 Drawing Sheets

(51) Int. Cl.
    *H01M 50/50*     (2021.01)
    *B60L 50/64*     (2019.01)
    *H01M 50/51*     (2021.01)
    *H01M 50/516*     (2021.01)
    *B23K 101/38*     (2006.01)

(52) U.S. Cl.
    CPC ......... *H01M 50/51* (2021.01); *H01M 50/516* (2021.01); *B23K 2101/38* (2018.08); *H01M 2220/20* (2013.01)

(56) References Cited

U.S. PATENT DOCUMENTS

| | | |
|---|---|---|
| 2005/0287427 A1 | 12/2005 | Kim et al. |
| 2009/0104516 A1 | 4/2009 | Yoshihara et al. |
| 2010/0129703 A1 | 5/2010 | Caumont et al. |
| 2010/0167115 A1 | 7/2010 | Okada et al. |
| 2010/0266890 A1 | 10/2010 | Caumont et al. |
| 2011/0309922 A1 | 12/2011 | Ghabra et al. |
| 2013/0189559 A1 | 7/2013 | Giere |
| 2014/0045039 A1 | 2/2014 | Vigneras |

FOREIGN PATENT DOCUMENTS

| | | |
|---|---|---|
| CN | 102770985 A | 11/2012 |
| DE | 25 16 530 A1 | 10/1975 |
| DE | 10 2006 015 566 A1 | 10/2007 |
| DE | 10 2008 059 970 A1 | 6/2010 |
| DE | 10 2009 058 723 A1 | 6/2011 |
| DE | 10 2010 020 065 A1 | 11/2011 |
| DE | 10 2011 075 853 A1 | 12/2011 |
| DE | 10 2010 046 529 A1 | 3/2012 |
| DE | 10 2011 080 977 A1 | 2/2013 |
| DE | 10 2013 213 540 A1 | 1/2015 |
| EP | 1 450 422 A1 | 8/2004 |
| FR | 2 915 626 A1 | 10/2008 |
| JP | 2002-246003 A | 8/2002 |

OTHER PUBLICATIONS

International Search Report (PCT/ISA/210) issued in PCT Application No. PCT/EP2016/062463 dated Sep. 28, 2016 with English translation (seven pages).

German-language Written Opinion (PCT/ISA/237) issued in PCT Application No. PCT/EP2016/062463 dated Sep. 28, 2016 (nine pages).

German-language Office Action issued in counterpart German Application No. 10 2015 213 129.7 dated Jan. 15, 2016 (six pages).

ACCUMULATOR ASSEMBLY WITH AN IMPROVED WELDING TECHNIQUE FOR A CELL CONNECTOR ELEMENT

CROSS REFERENCE TO RELATED APPLICATIONS

This application is a continuation of PCT International Application No. PCT/EP2016/062463, filed Jun. 2, 2016, which claims priority under 35 U.S.C. § 119 from German Patent Application No. 10 2015 213 129.7, filed Jul. 14, 2015, the entire disclosures of which are herein expressly incorporated by reference.

BACKGROUND AND SUMMARY OF THE INVENTION

The present invention relates to an accumulator assembly with an improved welding technique for fitting a cell connector element to an accumulator cell.

With electrically driven motor vehicles, there are used accumulator assemblies in which a plurality of accumulator cells, for example, prism-like accumulator cells, are connected one behind the other to form a module, generally connected one behind the other in series. The modules can be connected in series and/or parallel so as to be fixed or able to be configured during operation of the motor vehicle and form a traction accumulator. The traction accumulator feeds an electrical machine for driving a motor vehicle. The principles of electric drives are known to the person skilled in the art and for the sake of brevity, they are not further explained herein.

Cell connector elements are provided to connect opposing poles of two adjacent cells. The cell connectors are connected to two connection elements of two accumulator cells, wherein the connection elements of each accumulator cell are electrically connected to an electrode. It is known that the cell connector element can be welded to the connection element, for example, by way of circular weld seams. It is also known to screw or fasten the cell connector elements to the connection elements.

The laser welding of a cell connector element to a connection element has the disadvantage that a high energy input is carried out in the form of heat into the cell connector and the connection element. Plastics components which are arranged in the vicinity and in the worst case the accumulator cell itself may thereby become damaged. Furthermore, laser beam welding requires a minimum size, that is to say, height and width, of the connection elements and cell connector elements, whereby more structural space is required. Furthermore, laser beam welding requires considerable investments in system technology which are only justified when the connection process is considerably faster compared with alternative methods.

DE 10 2010 020 065 A1 discloses an energy storage module having a plurality of prismatic cells and a cell contacting unit which includes a carrier on which there are arranged a plurality of cell connectors by way of which a respective connection of a first polarity of a storage cell is electrically connected to a respective connection of a second polarity of an adjacent storage cell.

DE 10 2010 046 529 A1 discloses a frame system for receiving at least one battery cell.

US 2010/0167115 A1 discloses a battery system having a battery block with a plurality of battery cells which are arranged one on the other by way of insulating separation elements.

DE 10 2008 059 970 A1 discloses a battery in which flexible cell connectors are arranged on a rigid cell connector board.

DE 10 2011 080 977 A1 discloses a cell connector for electrically connecting connections of battery cells with a first layer of a first material and a second layer of a second material, wherein the two layers are each provided with a small hole and a larger hole, and the layers are arranged one above the other in such a manner that the small hole of a layer is arranged substantially coaxially with respect to the larger hole of the other layer, respectively.

DE 10 2006 015 566 A1 discloses a pole connector for electrically connecting two electric poles of individual cells of an electrochemical energy store which includes a bundle of at least two conductor elements which in each case bridge the intermediate space between poles which are intended to be connected to each other.

DE 10 2011 075 853 A1 discloses a cell connector having at least two compensation portions which extend in each case in a connection direction from the first contact region to the second contact region and which are separated from each other transversely relative to the connection direction.

DE 25 16 530 A1 discloses fitting a connector element to a battery by way of a plurality of weld spots.

An object of the invention is to provide an accumulator assembly with an improved weld connection.

This and other objects of the invention are achieved by an accumulator assembly in accordance with embodiments of the invention.

An accumulator assembly, according to an exemplary embodiment of the invention, includes a first accumulator cell having at least one electrical connection element, a second accumulator cell having at least one electrical connection element, a cell connector element which electrically connects an electrical connection element of the first accumulator cell with an electrical connection element of the second accumulator cell and which is welded at least to one of the electrical connection elements of one of the accumulator cells by way of a plurality of weld locations. The number and the location of the weld locations are selected in accordance with an anticipated current density in such a manner that, at locations with a higher anticipated current density, more weld locations are arranged and, at locations with a lower anticipated current density, no or fewer weld locations are arranged. The electrical connection element removes charge from the accumulator cell and/or supplies charge to the accumulator cell. The electrical connection element of the first accumulator, to which the cell connector element is connected, may have an opposing polarity to the electrical connection element of the second accumulator cell, to which the cell connector element is connected. It is thereby possible to achieve a series connection of accumulator cells, as desired, for example, in traction accumulators. The term, location with a lower anticipated current density, also includes a case where no current flows at this location. At locations with a higher anticipated current density, the anticipated current density is higher than at locations with a lower anticipated current density. The weld locations may form one or more weld surfaces.

In order to reduce the thermal input into the accumulator cell and in order to reduce the cycle time when fitting the cell connector element, the inventors propose minimizing the length of the weld seam between the cell connector element and the connection element with consistent contact resistance. This is achieved when the geometry of the weld seam and/or the weld spots is selected in an optimum manner with regard to the current flow, in particular the current density.

In the prior art, there are produced on the connection elements weld circuits which as a minimum requirement have a connection surface-area of approximately 40 mm². The inventors propose in contrast to this continuous and/or segmented weld seams or weld spots which with regard to the surface are significantly smaller than the weld circuits used in the prior art. For example, the surface-area of the weld seam and/or weld spots may be reduced by approximately half without increasing the contact resistance from one accumulator cell to another accumulator cell. Preferably, the surface-area of the weld locations at which a cell connector element is fitted to an electrical connection element is a maximum of 30 mm², preferably a maximum of 20 mm², more preferably a maximum of 15 mm².

A weld location may be a single weld spot. A plurality of weld locations may form a weld seam or a weld face. This may be the case when the locations are beside each other. The weld locations may form a continuous weld seam or a continuous weld face, or form an interrupted weld seam or an interrupted weld face, wherein each segment of the interrupted weld seam or weld face includes a plurality of weld locations which are arranged beside each other or on each other.

The weld locations may have individual weld spots, an interrupted weld seam and/or a continuous weld seam. The weld locations may be in the form of a continuous part-circle including a weld seam, an interrupted part-circle including a plurality of spaced-apart weld seams or spaced-apart weld spots, a continuous semi-circle including a weld seam, an interrupted semi-circle including a plurality of spaced-apart weld seams or spaced-apart weld spots, two touching continuous straight lines including a weld seam, two touching interrupted straight lines including a plurality of spaced-apart weld seams or spaced-apart weld spots, two touching continuous straight lines which include a weld seam and which are arranged at right-angles with respect to each other, two touching interrupted straight lines which include a weld seam and which are arranged at right-angles with respect to each other and/or an interrupted straight line including a plurality of spaced-apart weld seams or spaced-apart weld spots. A continuous straight line, a continuous part-circle and a continuous semi-circle may have a plurality of sequential touching weld locations or a linear weld seam. An interrupted part-circle, an interrupted semi-circle and an interrupted straight line may have a plurality of segments at which the weld locations touch each other or which form a weld seam. The weld spots or the weld seam may, for example, be produced by laser welding. A line which is formed by weld locations and a part-circle or semi-circle which is formed by weld locations has a width which corresponds to the width of the weld locations depending on the welding technology used.

The first accumulator cell and the second accumulator cell may have an electrode which is coupled to the connection element and which removes charge from the respective accumulator cell. The electrode may have a round cross-section. The electrode may extend from the connection element into the accumulator cell. The continuous part-circle may be arranged around the electrode. The interrupted part-circle may be arranged around the electrode. The interrupted straight line may be arranged in an edge region of the connection element which is directed in the direction of the other accumulator cell.

The cell connector element may have an open region which extends between the electrode of the first accumulator cell and the electrode of the second accumulator cell. In one embodiment, the electrode may not be covered by the cell connector element, that is to say, the open region extends over the electrode. The open region increases the resilience of the cell connector in order to absorb production tolerances and size changes of the accumulator cells during operation.

The continuous part-circle including a weld seam, the interrupted part-circle including a plurality of spaced-apart weld seams or spaced-apart weld spots, the continuous semi-circle including a weld seam, the interrupted semi-circle including a plurality of spaced-apart weld seams or spaced-apart weld spots, the touching continuous straight lines including a weld seam, the touching interrupted straight lines including a plurality of spaced-apart weld seams or spaced-apart weld spots, the touching continuous straight lines which include a weld seam and which are arranged at right-angles with respect to each other, the touching interrupted straight lines which are arranged at right-angles with respect to each other may be arranged offset beside the open region and the electrode in the direction of the other accumulator cell, respectively. The above-mentioned weld locations may be arranged offset at both sides beside the open region and the electrode and in the direction of the other accumulator cell in each case.

The cell connector element may have a curvature in the region between the electrical connection element of the first accumulator cell and the electrical connection element of the second accumulator cell. The curvature also increases the resilience of the cell connector in order to absorb production tolerances and size changes of the accumulator cells during operation.

The highest line of the curvature may be arranged perpendicularly to the open region.

The invention enables the surface-area of the seam to be reduced by approximately 50%. The process time during production of the accumulator assembly according to the invention can thereby also be reduced, which in particular with high batch numbers has a significant influence on the investment required for the system technology. Furthermore, a halving of the surface-area of the weld seam means that the energy input into the components during welding is also approximately halved. It is thereby possible to construct the cell connector element and the electrical connection elements to be smaller, whereby structural space and weight are reduced. In addition, the thermal load of the accumulator cell and nearby plastics material components is reduced, which during the development of new accumulator modules provides a greater structural degree of freedom.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
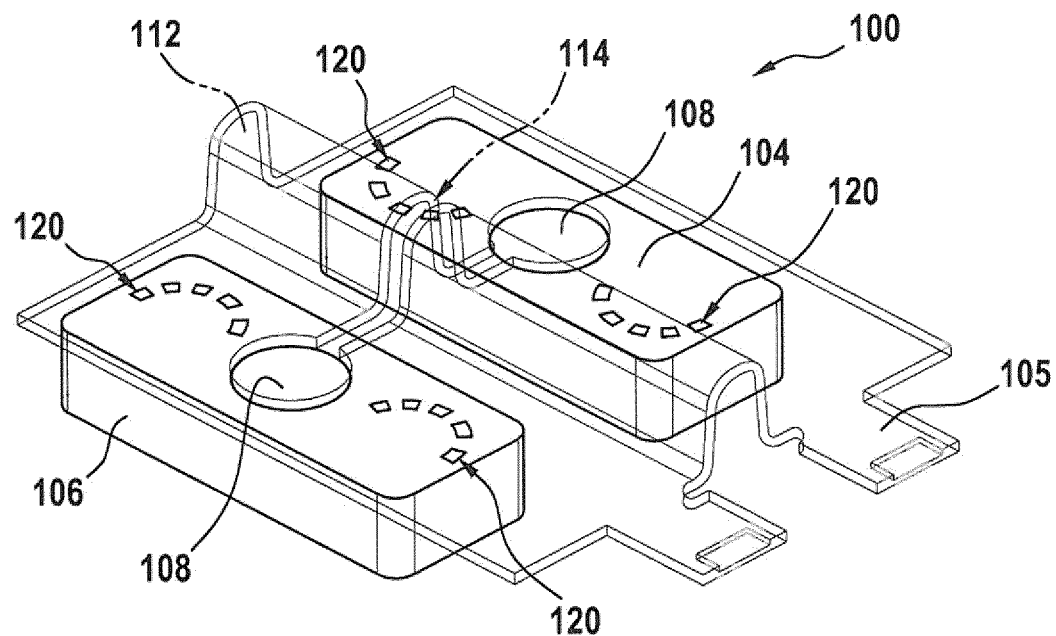
FIG. 1 is a perspective view of an accumulator assembly according to the invention.
Figure 2:
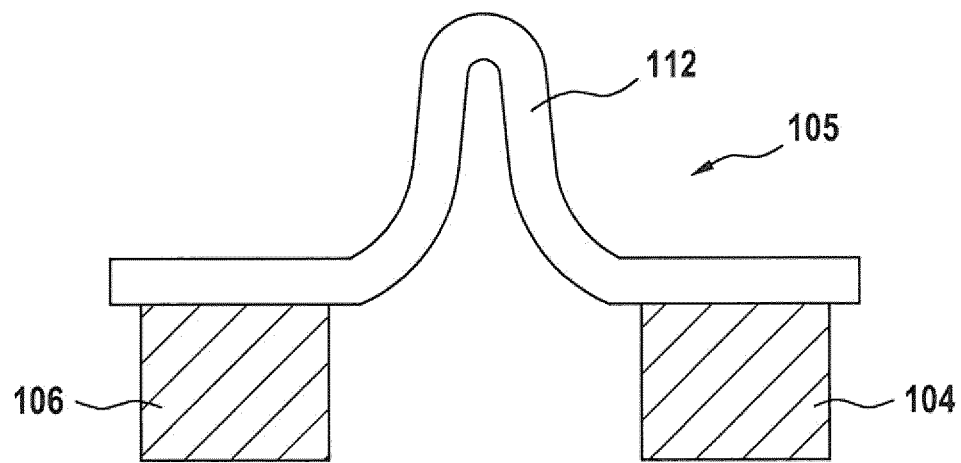
FIG. 2 is a schematic section through a connection element and two electrical connection elements.
Figure 10:
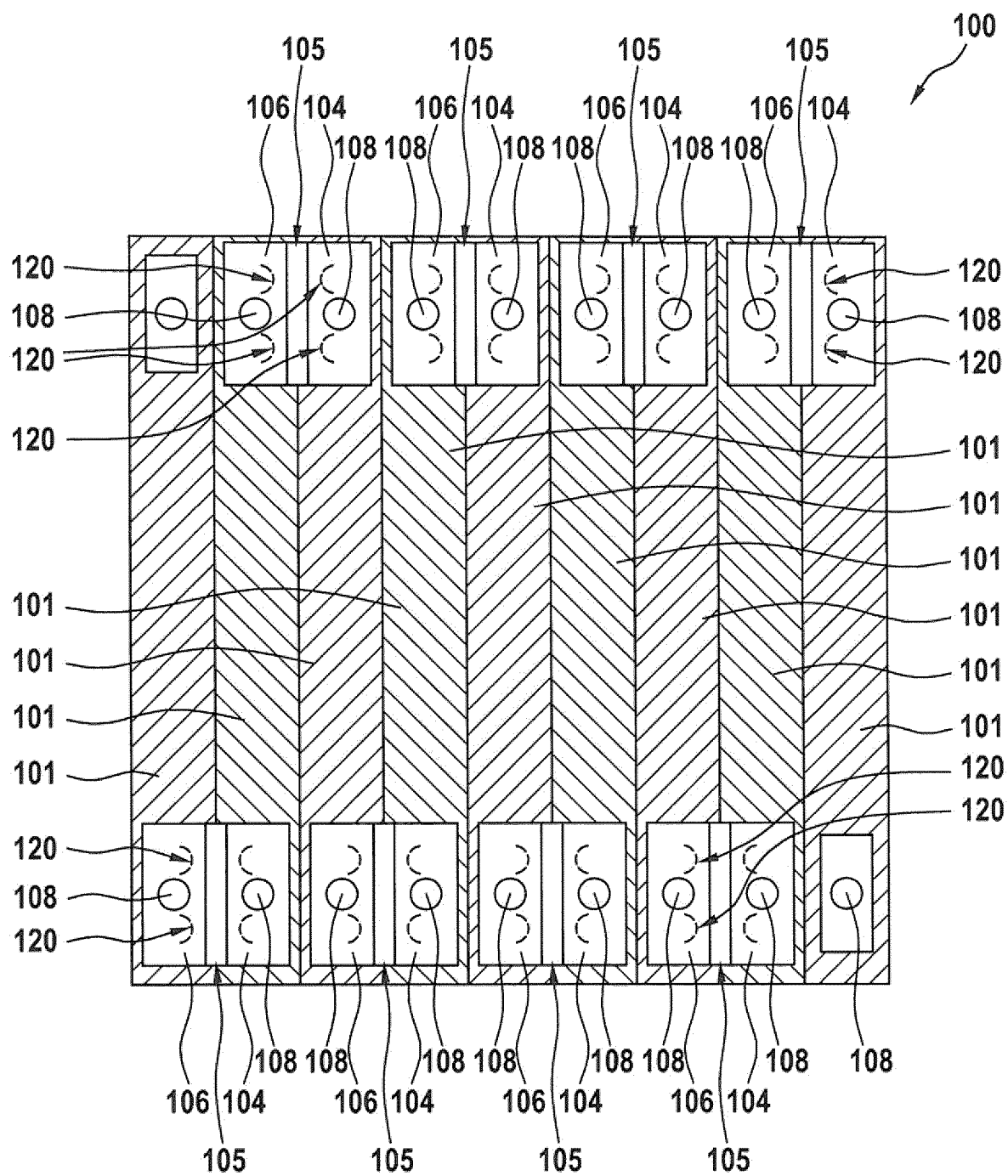
FIG. 10 is a plan view of an accumulator assembly.

Reference may be made to FIG. 10 which shows a first embodiment of the invention. Furthermore, reference may be made to FIG. 1 which is a perspective view of connection elements 104 and a connector element 105 and reference may be made to FIG. 2 which shows a section through the connector element 105 and the connection elements 104, 106.

A plurality of accumulator cells 101 is arranged beside each other. Each accumulator cell 101 includes a first connection element 104 and a second connection element 106 in which an electrode 108 with a round cross-section extends. The electrode 108 also extends inside the accumulator cell 101 in order to supply charge and/or to remove it from the accumulator cell 101.

The first connection element 104 of a first accumulator cell 101 is connected by way of a cell connector element 105 to the second connection element 106 of a second accumulator cell 101. In the first embodiment, the cell connector elements 105 are secured by way of a plurality of weld spots which form an interrupted part-circle 120.

The interrupted part-circle 120 is arranged beside the electrode 108. The weld spots of the interrupted part-circle 120 are located in a region in which high current densities may be anticipated. In this location, the transition from the connection element 104, 106 to the connector element 105 has a low electrical resistance. The connector element 105 further has an open region 114 which extends from the electrode 108 of an accumulator cell 101 to an electrode 108 of another accumulator cell 101 and which is narrower than the electrode 108. Furthermore, the electrodes 108 are not covered by the free region. The open region 114 serves to absorb mechanical tolerances and size changes, for example, as a result of the temperature and charge state.

Furthermore, the connector element 105 includes a substantially U-shaped curvature 112 which extends substantially perpendicularly relative to the open region 114. The substantially U-shaped curvature 112 also serves to absorb mechanical tolerances and size changes as a result of temperature and charge state.

In the first embodiment, the interrupted part-circle 120 which is formed by weld spots is substantially a semi-circle.

Figure 3:
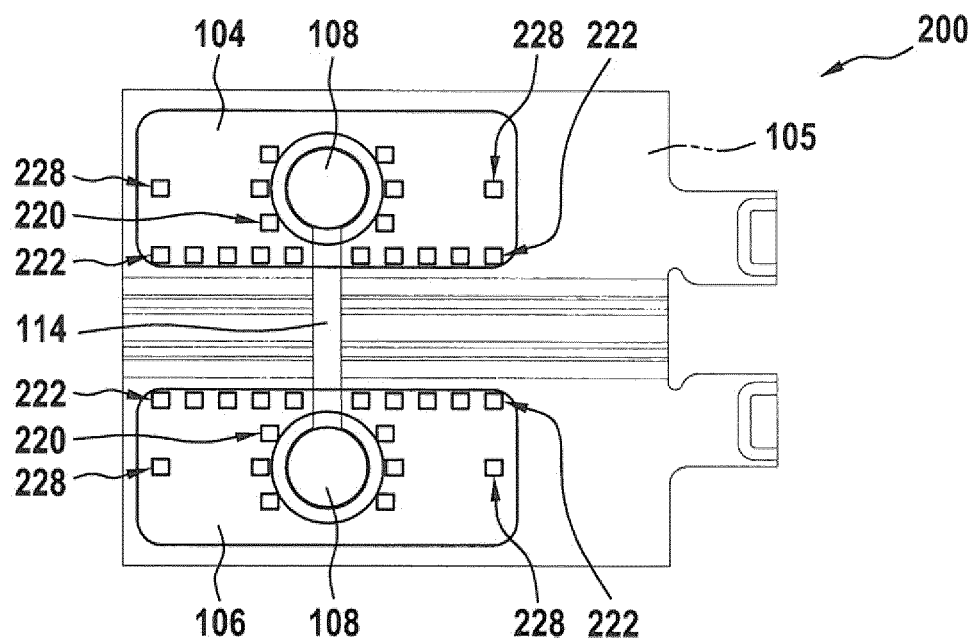
FIG. 3 shows a second embodiment of the invention with two different types of weld seams.

Reference may be made to FIG. 3 which shows a second embodiment of the invention, wherein for the sake of brevity, reference is made only to the differences with respect to the first embodiment. The connector element 105 is connected to the connection elements 104, 106 by way of a part-circle-like weld spot arrangement 220. The weld spots 220 which are arranged in a part-circle-like manner form, on each electrode, two part-circles which substantially correspond to a quarter-circle. Furthermore, the connector element 105 is secured by way of an interrupted straight line 222 of weld spots to the connection elements 104, 106 in order to electrically connect the connector element 105 to the connection elements 104, 106. Optional individual weld spots 228 serve to mechanically fix the connector element 105 to the connection elements 104, 106.

Figure 4:
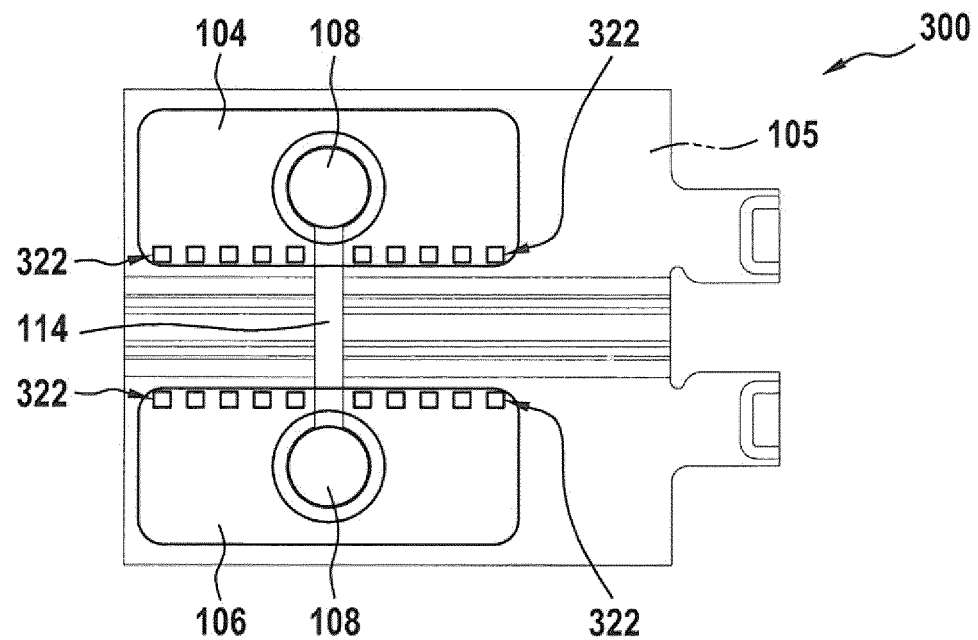
FIG. 4 shows a third embodiment with an interrupted straight weld seam.

Reference may be made to FIG. 4 which shows a third embodiment 300 of the present invention in which the connector element 105 is fitted by way of an interrupted straight line 322 of weld spots. The interrupted line 322 is arranged at the edge region of the connection element 104, 106 which is orientated in the direction of the other connection element. Each weld spot may have an edge length of approximately 1 mm.

Figure 5:
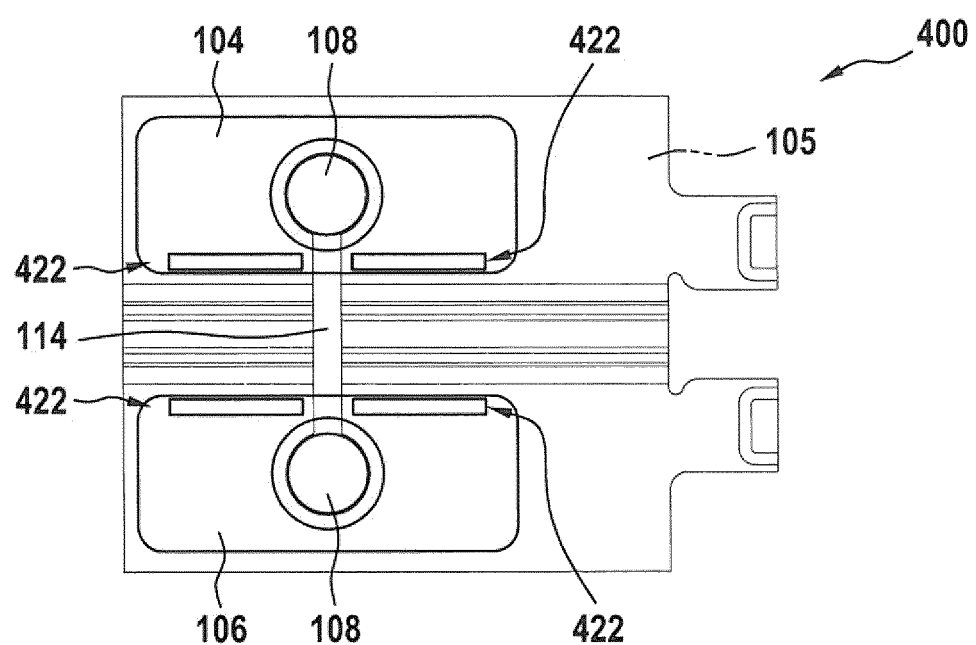
FIG. 5 shows a fourth embodiment with a plurality of continuous straight weld seams.

Reference may be made to FIG. 5 which shows a fourth embodiment of the present invention in which the connector element 105 is electrically connected to the connection elements 104, 106 by way of a continuous straight line at weld locations which form a weld seam 422.

Figure 6:
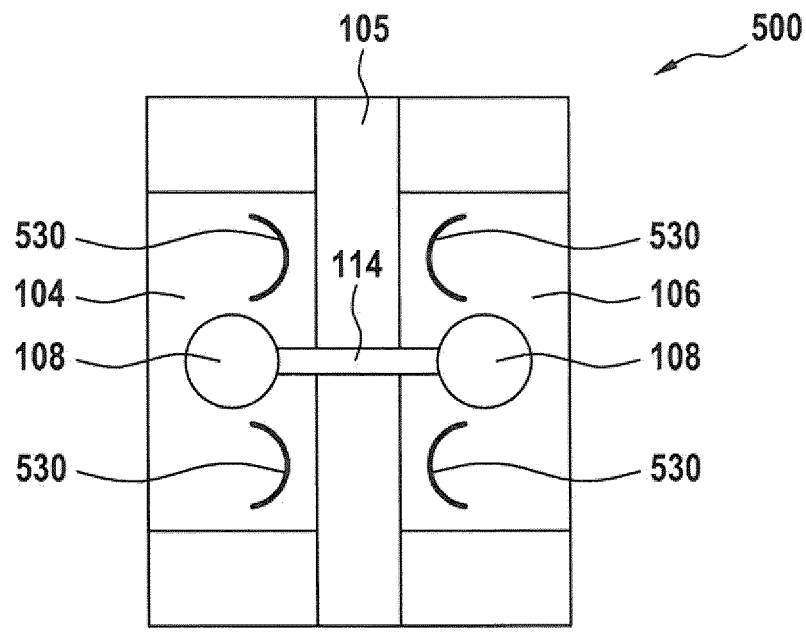
FIG. 6 shows a fifth embodiment of the invention in which the weld seams are in the form of part-circles.
Figure 7:
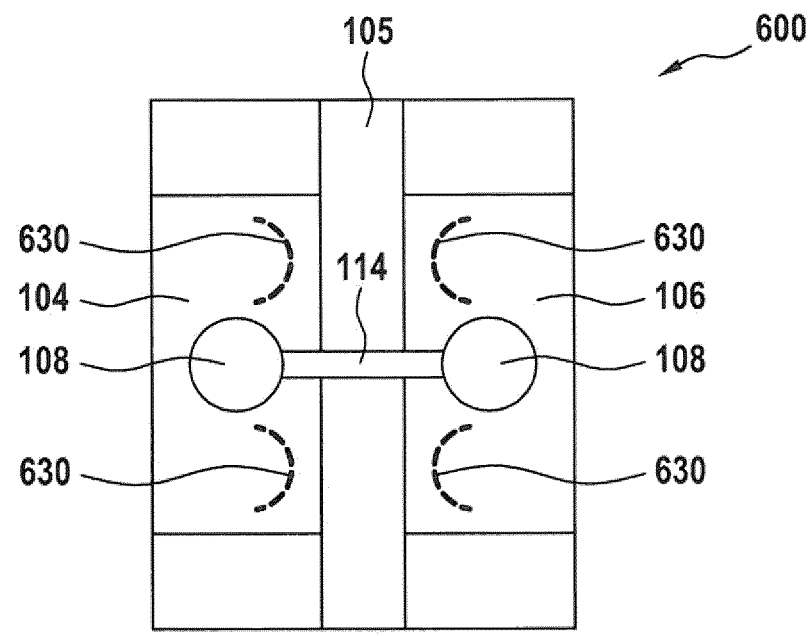
FIG. 7 shows a sixth embodiment in which the weld seams are in the form of interrupted part-circles.
Figure 8:
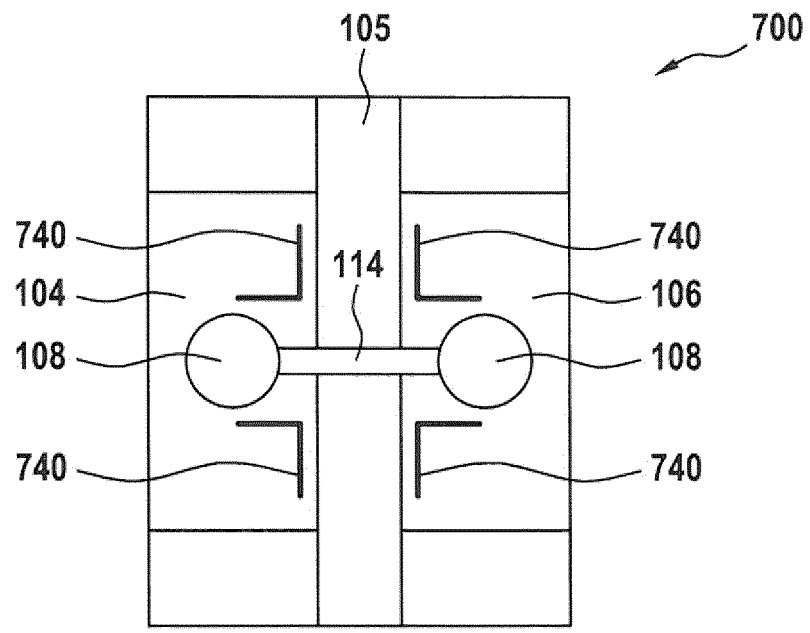
FIG. 8 shows a seventh embodiment in which the weld seams are in the form of continuous straight lines which are arranged at right-angles with respect to each other.
Figure 9:
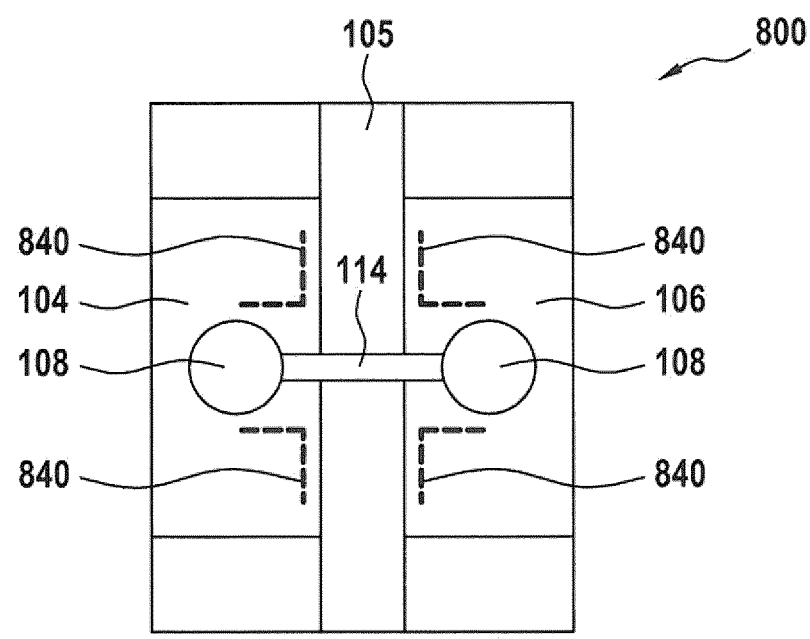
FIG. 9 shows an eighth embodiment with interrupted straight lines which are arranged at right-angles with respect to each other.

Reference may be made to FIGS. 6 to 9 which show different embodiments regarding weld locations, wherein FIG. 6 shows a fifth embodiment 500 of the invention, FIG. 7 shows a sixth embodiment 600 of the invention, FIG. 8 shows a seventh embodiment 700 of the invention, and FIG. 9 shows an eighth embodiment 800 of the invention. In the fifth to ninth embodiments, weld locations 530, 630, 740, 840 are produced beside the electrode 108 and the open region 114, wherein the weld locations 530, 630, 740, 840 are arranged offset from the center of the electrode 108 in the direction of the other connection element 104, 106 in each case.

In the fifth embodiment according to FIG. 6, the weld locations 530 form a part-circle-like continuous weld seam 530. The convex end of the part-circle-like weld seam 530 is orientated in the direction of the other connection element 104, 106 in each case.

The sixth embodiment according to FIG. 7 substantially corresponds to the fifth embodiment 500 according to FIG. 6, wherein in the sixth embodiment 600, the weld locations 630 are formed by way of an interrupted part-circle 630 with a plurality of weld segments or spaced-apart weld spots.

In the seventh embodiment according to FIG. 8, the weld locations 740 are formed by way of two touching right-angled lines 740. A first line is arranged substantially parallel with the edges of the connection elements 104, 106, which is orientated in the direction of the opposing connection element 104, 106 in each case. The second continuous straight weld seam is orientated at right-angles with respect to the edge of the connection element 104, 106 which is orientated in the direction toward the opposing connection element 104, 106. The connection locations of the weld locations 740 which are formed by way of the two linear weld seams 740 are orientated in the direction of the center and/or open region 114 of the connection element 105.

The eighth embodiment of the invention 800 according to FIG. 9 substantially corresponds to the seventh embodiment 700 according to FIG. 8, wherein the interrupted lines are formed by way of a plurality of segments which are spaced apart from each other or weld seams which are spaced apart from each other and which each have a plurality of weld spots or weld locations.

The weld locations, weld spots, weld seams and the like may, for example, be formed by way of laser welding. Laser welding methods are currently preferred as a result of the comparatively low thermal input into the accumulator cells.

An interrupted line, an interrupted part-circle, an interrupted semi-circle or the like includes a plurality of segments which are spaced apart from each other. Each segment may have a weld spot or a weld location. However, it is also possible for each segment to have a plurality of weld locations which are arranged in a row and which, for example, form a (short) continuous weld seam. Each weld location has an extent in terms of length and width. A weld location in the context of this invention is consequently two-dimensional. A line or a part-circle or a segment is formed by way of a plurality of adjacent weld locations. The term, adjacent weld locations, does not imply that individual spots in the sense of spot welding have to be produced. A continuous line, a continuous part-circle, a continuous semi-circle or the like may also be produced by way of a continuous welding operation, whereby the adjacent weld locations are produced.

The inventors of the present invention have recognized that a connection element 105 can be welded to connection elements 104, 106 of an accumulator cell by way of comparatively short weld seams and/or by way of a comparatively small number of weld spots to a connection element 104, 106 of an accumulator cell 110 if the weld locations, weld spots, weld seams or the like are located in a region in which a higher current density may be anticipated than at other locations. As a result of the smaller number of weld locations, weld spots, weld seams or the like, the thermal load of the accumulator cell 101 can be reduced during production. Furthermore, the cycle time for the welding operation can be reduced, which is highly relevant for large batch numbers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An accumulator assembly, comprising:
   a first accumulator cell having a first electrical connection element;
   a second accumulator cell having a second electrical connection element; and
   a cell connector element which electrically connects the first electrical connection element of the first accumulator cell with the second electrical connection element of the second accumulator cell and which is welded at least to one of the electrical connection elements by way of a plurality of weld locations, wherein
   a number and a location of the weld locations are selected in accordance with an anticipated current density in such a manner that, at locations with a higher anticipated current density, more weld locations are arranged and, at locations with a lower anticipated current density, fewer weld locations are arranged, wherein
   a number of the fewer weld locations is greater than zero,
   the cell connector element defines an opening in the cell connector element which extends between an electrode of the first accumulator cell and an electrode of the second accumulator cell,
   the opening is narrower than the electrode of the first accumulator cell and the electrode of the second accumulator cell,
   the opening extends over the electrode of the first or second accumulator cell,
   the cell connector element has a U-shaped curvature that extends above the first electrical connection element of the first accumulator cell and the second electrical connection element of the second accumulator cell in a region between the first electrical connection element of the first accumulator cell and the second electrical connection element of the second accumulator cell,
   a portion of the opening is disposed in the U-shaped curvature, and
   the U-shaped curvature extends perpendicularly relative to the opening.

2. The accumulator assembly according to claim 1, wherein the weld locations have weld spots, an interrupted weld seam and/or a continuous weld seam.

3. The accumulator assembly according to claim 1, wherein the weld locations have at least one of the following forms:
   a continuous part-circle comprising a weld seam;
   an interrupted part-circle comprising a plurality of spaced-apart weld seams or spaced-apart weld spots;
   a continuous semi-circle comprising a weld seam;
   an interrupted semi-circle comprising a plurality of spaced-apart weld seams or spaced-apart weld spots;
   two touching continuous straight lines comprising a weld seam;
   two touching interrupted straight lines comprising a plurality of spaced-apart weld seams or spaced-apart weld spots;
   two touching continuous straight lines which comprise a weld seam and which are arranged at right-angles with respect to each other;
   two touching interrupted straight lines which comprise a plurality of spaced-apart weld seams or spaced-apart weld spots and which are arranged at right-angles with respect to each other; and/or
   an interrupted straight line comprising a plurality of spaced-apart weld seams or spaced-apart weld spots.

4. The accumulator assembly according to claim 2, wherein the weld locations have at least one of the following forms:
   a continuous part-circle comprising a weld seam;
   an interrupted part-circle comprising a plurality of spaced-apart weld seams or spaced-apart weld spots;
   a continuous semi-circle comprising a weld seam;
   an interrupted semi-circle comprising a plurality of spaced-apart weld seams or spaced-apart weld spots;
   two touching continuous straight lines comprising a weld seam;
   two touching interrupted straight lines comprising a plurality of spaced-apart weld seams or spaced-apart weld spots;
   two touching continuous straight lines which comprise a weld seam and which are arranged at right-angles with respect to each other;
   two touching interrupted straight lines which comprise a plurality of spaced-apart weld seams or spaced-apart weld spots and which are arranged at right-angles with respect to each other; and/or
   an interrupted straight line comprising a plurality of spaced-apart weld seams or spaced-apart weld spots.

5. The accumulator assembly according to claim 1, wherein the first and the second accumulator cells each have a respective electrode which is coupled to the corresponding electrical connection element and which removes charge from the respective accumulator cell, wherein
   a continuous part-circle is arranged around the electrode,
   an interrupted part-circle is arranged around the electrode, and/or
   an interrupted straight line is arranged at an edge region of the connection element.

6. The accumulator assembly according to claim 4, wherein the first and the second accumulator cells each have a respective electrode which is coupled to the corresponding electrical connection element and which removes charge from the respective accumulator cell, wherein
- the continuous part-circle is arranged around the electrode,
- the interrupted part-circle is arranged around the electrode, and/or
- the interrupted straight line is arranged at an edge region of the connection element.

7. The accumulator assembly according to claim 6, wherein the cell connector element has an open region which extends between the electrode of the first accumulator cell and the electrode of the second accumulator cell.

8. The accumulator assembly according to claim 3, wherein the cell connector element has an open region which extends between an electrode of the first accumulator cell and an electrode of the second accumulator cell, wherein
- the continuous part-circle comprising the weld seam,
- the interrupted part-circle comprising the plurality of spaced-apart weld seams or spaced-apart weld spots,
- the continuous semi-circle comprising the weld seam,
- the interrupted semi-circle comprising the plurality of spaced-apart weld seams or spaced-apart weld spots,
- the two touching continuous straight lines comprising the weld seam,
- the two touching interrupted straight lines comprising the plurality of spaced-apart weld seams or spaced-apart weld spots,
- the two touching continuous straight lines which comprise the weld seam and which are arranged at right-angles with respect to each other, and/or
- the two touching interrupted straight lines which comprise the plurality of spaced apart weld seams or spaced-apart weld spots and which are arranged at right-angles with respect to each other,
- are arranged offset beside the open region and the corresponding electrode and in the direction of the other accumulator cell, respectively.

9. The accumulator assembly according to claim 7, wherein
- the continuous part-circle comprising the weld seam,
- the interrupted part-circle comprising the plurality of spaced-apart weld seams or spaced-apart weld spots,
- the continuous semi-circle comprising the weld seam,
- the interrupted semi-circle comprising the plurality of spaced-apart weld seams or spaced-apart weld spots,
- the two touching continuous straight lines comprising the weld seam,
- the two touching interrupted straight lines comprising the plurality of spaced-apart weld seams or spaced-apart weld spots,
- the two touching continuous straight lines which comprise the weld seam and which are arranged at right-angles with respect to each other, and/or
- the two touching interrupted straight lines which comprise the plurality of spaced apart weld seams or spaced-apart weld spots and which are arranged at right-angles with respect to each other,
- are arranged offset beside the open region and the corresponding electrode and in the direction of the other accumulator cell, respectively.

10. The accumulator assembly according to claim 8, wherein
- the continuous part-circle comprising the weld seam,
- the interrupted part-circle comprising the plurality of spaced-apart weld seams or spaced-apart weld spots,
- the continuous semi-circle comprising the weld seam,
- the interrupted semi-circle comprising the plurality of spaced-apart weld seams or spaced-apart weld spots,
- the two touching continuous straight lines comprising the weld seam,
- the two touching interrupted straight lines comprising the plurality of spaced-apart weld seams or spaced-apart weld spots,
- the two touching continuous straight lines which comprise the weld seam and which are arranged at right-angles with respect to each other, and/or
- the two touching interrupted straight lines which comprise the plurality of spaced-apart weld seams or spaced-apart weld spots and which are arranged at right-angles with respect to each other,
- are arranged offset at both sides beside the open region and the corresponding electrode and in the direction of the other accumulator cell, respectively.

11. The accumulator assembly according to claim 9, wherein
- the continuous part-circle comprising the weld seam,
- the interrupted part-circle comprising the plurality of spaced-apart weld seams or spaced-apart weld spots,
- the continuous semi-circle comprising the weld seam,
- the interrupted semi-circle comprising the plurality of spaced-apart weld seams or spaced-apart weld spots,
- the two touching continuous straight lines comprising the weld seam,
- the two touching interrupted straight lines comprising the plurality of spaced-apart weld seams or spaced-apart weld spots,
- the two touching continuous straight lines which comprise the weld seam and which are arranged at right-angles with respect to each other, and/or
- the two touching interrupted straight lines which comprise the plurality of spaced-apart weld seams or spaced-apart weld spots and which are arranged at right-angles with respect to each other,
- are arranged offset at both sides beside the open region and the corresponding electrode and in the direction of the other accumulator cell, respectively.

* * * * *